United States Patent
Khouw et al.

(10) Patent No.: US 8,215,433 B2
(45) Date of Patent: *Jul. 10, 2012

(54) AUTOMOBILE OVER-BULKHEAD AIR INTAKE SYSTEM

(75) Inventors: Raymond Khouw, Dublin, OH (US);
Ryan Chapman, Powell, OH (US);
Takeshi Hagiwara, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/816,926

(22) Filed: Jun. 16, 2010

(65) Prior Publication Data

US 2010/0252347 A1 Oct. 7, 2010

Related U.S. Application Data

(63) Continuation of application No. 11/754,942, filed on May 29, 2007, which is a continuation of application No. 10/887,851, filed on Jul. 12, 2004, now Pat. No. 7,237,635.

(51) Int. Cl.
*B60K 13/02* (2006.01)
(52) U.S. Cl. ........................ 180/68.3; 180/69.2
(58) Field of Classification Search ................. 180/68.1, 180/68.2, 68.3
See application file for complete search history.

(56) References Cited

U.S. PATENT DOCUMENTS

| | | | |
|---|---|---|---|
| 1,846,283 A | 2/1932 | Summers | |
| 1,957,919 A | 5/1934 | Tice | |
| 2,197,503 A | 4/1940 | Martin | |
| 2,684,204 A | 7/1954 | Lamb | |
| 2,881,860 A | 4/1959 | Ternes | |
| 2,913,065 A | 11/1959 | Lyon, Jr. | |
| 3,696,730 A | 10/1972 | Masuda et al. | |
| 3,948,234 A | 4/1976 | Shumaker, Jr. | |
| 3,987,862 A | 10/1976 | Lidstone | |
| 4,164,262 A | 8/1979 | Skatsche et al. | |
| 4,420,057 A | 12/1983 | Omote et al. | |
| 4,533,012 A * | 8/1985 | Komoda | 180/68.3 |

(Continued)

FOREIGN PATENT DOCUMENTS

JP S61104233 7/1986

(Continued)

OTHER PUBLICATIONS

Office Action of U.S. Appl. No. 12/816,910 dated Oct. 28, 2010.

(Continued)

*Primary Examiner* — Katy M Ebner
(74) *Attorney, Agent, or Firm* — Rankin Hill & Clark LLP

(57) ABSTRACT

An automobile air intake system is provided that channels air from outside the automobile engine compartment to the engine. The automobile air intake system according to an embodiment of the invention includes an intake enclosure coupled to a bulkhead across the front of the engine compartment. The automobile grille, radiator, and a front portion of the hood in front of the bulkhead form a flow channel to an intake port of the intake enclosure. Aspects of the invention include a screen extending from the bulkhead to the grille for inhibiting the flow of water and particles through the flow channel. Other aspects provide an alternative air path for channeling air from the engine compartment to the intake enclosure.

26 Claims, 14 Drawing Sheets

U.S. PATENT DOCUMENTS

| | | | |
|---|---|---|---|
| 4,548,166 A | 10/1985 | Gest | |
| 4,778,029 A | 10/1988 | Thornburgh | |
| 4,878,555 A | 11/1989 | Yasunaga et al. | |
| 4,932,490 A | 6/1990 | Dewey | |
| 4,971,172 A | 11/1990 | Hoffman et al. | |
| 5,022,479 A | 6/1991 | Kiser et al. | |
| 5,054,567 A | 10/1991 | Hoffman | |
| 5,195,484 A | 3/1993 | Knapp | |
| 5,251,712 A | 10/1993 | Hayashi et al. | |
| 5,417,177 A | 5/1995 | Taguchi et al. | |
| 5,564,513 A | 10/1996 | Wible et al. | |
| 5,660,243 A | 8/1997 | Anzalone et al. | |
| 5,794,733 A | 8/1998 | Stosel et al. | |
| 5,860,685 A | 1/1999 | Horney et al. | |
| 5,881,479 A | 3/1999 | Pavey | |
| 6,056,075 A | 5/2000 | Kargilis | |
| 6,059,061 A | 5/2000 | Economoff et al. | |
| D433,656 S | 11/2000 | Hanagan et al. | |
| 6,276,482 B1 | 8/2001 | Moriya et al. | |
| 6,302,228 B1 | 10/2001 | Cottereau et al. | |
| 6,453,866 B1 | 9/2002 | Altmann et al. | |
| 6,484,835 B1 | 11/2002 | Krapfl et al. | |
| 6,510,832 B2 | 1/2003 | Maurer et al. | |
| 6,564,768 B2 | 5/2003 | Bauer et al. | |
| 6,804,360 B1 | 10/2004 | Misawa et al. | |
| 6,805,088 B2 | 10/2004 | Tachibana et al. | |
| 6,880,655 B2 | 4/2005 | Suwa et al. | |
| 7,059,439 B2 * | 6/2006 | Storz et al. | 180/68.1 |
| 7,237,635 B2 | 7/2007 | Khouw et al. | |
| 2002/0059912 A1 | 5/2002 | Bauer et al. | |
| 2002/0078916 A1 | 6/2002 | Altmann et al. | |
| 2002/0088656 A1 | 7/2002 | Bergman | |
| 2003/0042055 A1 | 3/2003 | Suwa et al. | |
| 2003/0106730 A1 | 6/2003 | Dennison et al. | |
| 2003/0188902 A1 | 10/2003 | Decuir | |
| 2004/0108152 A1 | 6/2004 | Storz et al. | |
| 2004/0231900 A1 | 11/2004 | Tanaka et al. | |
| 2005/0023057 A1 | 2/2005 | Maeda et al. | |
| 2005/0076871 A1 | 4/2005 | Paek | |
| 2005/0230162 A1 | 10/2005 | Murayama et al. | |
| 2006/0006011 A1 | 1/2006 | Khouw et al. | |

FOREIGN PATENT DOCUMENTS

| | | |
|---|---|---|
| JP | 62110023 | 5/1987 |
| JP | 62-110023 | 7/1987 |
| JP | S6374334 | 5/1988 |
| JP | 1122998 | 5/1989 |
| JP | 7-4133 | 1/1995 |
| JP | 08-177658 | 7/1996 |
| JP | H09136551 | 5/1997 |
| JP | H11294279 | 10/1999 |
| JP | 200120813 | 1/2001 |
| JP | 2004-190671 | 7/2004 |
| JP | 2004183514 | 7/2004 |
| JP | 2005-297888 | 10/2005 |
| WO | 0023696 | 4/2000 |

OTHER PUBLICATIONS

2002 Honda CR-V AWD SE 5DR photographs, pp. 1-9.
Honda Web Parts Catalog—v2.2.2, Apr. 2010 showing intake assembly for 2002 Honda CR-V.
Detroit 2002 Mitsubishi Montero Limited 4wd—Center View photograph.
Detroit 2002 BMW X5—Center View photograph.
2002 Nissan Murano—Center View photograph.
NY 2002 Infiniti G35—Center View photograph.
Frankfurt 1999 Mazda 323 1.5 S Exclusive—Center View photograph.
Detroit 2002 Nissan Altima 2.5 S—Engine Open Door photograph.
Office Action of U.S. Appl. No. 11/754,942 dated Jul. 30, 2009.
Office Action of U.S. Appl. No. 11/754,942 dated Feb. 2, 2010.
Office Action of U.S. Appl. No. 11/754,942 dated Feb. 28, 2011.
Office Action of U.S. Appl. No. 12/816,910 dated May 13, 2011.
Office Action of U.S. Appl. No. 12/755,894 dated Jun. 28, 2011.
Office Action of U.S. Appl. No. 12/816,910 dated Oct. 20, 2011.
Office Action of U.S. Appl. No. 11/754,942 dated Aug. 17, 2011.
Office Action of U.S. Appl. No. 12/755,894 dated Dec. 13, 2011.
Office Action of U.S. Appl. No. 12/816,910 dated Apr. 5, 2012.

* cited by examiner

AUTOMOBILE OVER-BULKHEAD AIR INTAKE SYSTEM

This application is a continuation of U.S. application Ser. No. 11/754,942 filed on May 29, 2007, which is a continuation of U.S. application Ser. No. 10/887,851 filed on Jul. 12, 2004, now issued as U.S. Pat. No. 7,237,635, both expressly incorporated herein by reference.

TECHNICAL FIELD

This invention relates generally to an automobile air intake system. More particularly, the invention relates to an automobile over-bulkhead air intake system and a method for drawing air into a combustion engine.

BACKGROUND

Air intake systems provide necessary air to internal combustion engines to aid in the combustion process. Conventional intake systems either draw air from inside the engine compartment, or they draw air from outside the vehicle via an exterior intake port. Systems designed where the air is drawn from inside the engine compartment commonly suffer a drawback of drawing in warmer and less dense air than exterior air. This reduces the efficiency of the engine compared with the use of cooler exterior air. A solution to address the shortcoming of these systems is to draw in cooler exterior air. However, systems designed where the air is drawn in via an exterior intake port commonly suffer a drawback of drawing in air that includes water or particles, which can block the engine intake, inhibit airflow, or damage the engine. Solutions have been proposed to address the shortcomings of these exterior intake port systems.

U.S. Pat. No. 5,564,513 to Wible et al. discloses an exterior air intake system for an internal combustion engine that includes an intake port disposed under the vehicle hood in front of the radiator. The intake port includes a filter for removing solid particulates from the intake air and for separating water from the air. The intake port, however, requires a large space forward of the radiator under the hood of the vehicle, which is difficult to fit within the compact engine compartments of contemporary vehicles. Further, due to the filter's proximity to the exterior opening of the port, the filter may have a propensity to clog quickly to inhibit airflow and may require frequent changing.

U.S. Pat. No. 6,510,832 issued to Maurer et al. discloses an exterior air intake system for an internal combustion engine that is aimed at avoiding water intake by providing a main air inlet to exterior air, an auxiliary air inlet, a moisture sensor, and an electric valve to close the main air inlet. When moisture is sensed in the main inlet, the electric valve closes the main inlet and air is drawn from the engine compartment into the auxiliary air inlet. The Maurer system, however, requires pneumatic or electro-pneumatic drives and an electrical moisture sensor. These complicated elements may be subject to an increased chance of failure.

U.S. Pat. No. 5,022,479 to Kiser et al. discloses a rectangular channel formed in the vehicle hood that includes a forward ambient air inlet and a rear air outlet. The channel includes a series of baffles to capture moisture from air flowing therethrough. A sealing sleeve is provided to bridge between the channel and the engine air cleaner. The Kiser system has drawbacks in that it occupies a large amount of hood space and relies upon a special sleeve design to connect with the air cleaner system.

U.S. Pat. No. 4,971,172 to Hoffman et al. discloses air ducts formed in the hood of a truck to eliminate water and heavier particles from the air stream. The intake pathway includes vertical ducts with drainholes to permit the drainage of water collected in the pathway. The intake pathways occupy a large amount of hood space and create a long conduit to the intake system, which inhibits efficient airflow.

Accordingly, a need exists for an improved air intake system. In addition, a need exists for a method of efficiently obtaining cool exterior air for an internal combustion engine having low moisture and/or particulate content.

SUMMARY

In order to overcome drawbacks of the prior art and/or provide an alternate arrangement, aspects of the present invention provide an automobile air intake system for providing air from outside the engine compartment to the engine. The automobile air intake system according to an embodiment of the invention includes an intake enclosure coupled to a bulkhead across the front of the engine compartment. The automobile grille, radiator, and a front portion of the hood in front of the bulkhead form an airflow channel to an intake port of the intake enclosure. Aspects of the invention include a screen extending from the bulkhead to the grille for inhibiting the flow of water and particles through the flow channel and for forming a transverse intake path. Other aspects provide an alternative air path for channeling air from the engine compartment to the intake enclosure.

Aspects of the present invention further provide an automobile air intake system for providing air from the engine compartment to the automobile engine via an intake path through the hood. The intake path through the hood may be an alternate path for providing air to the engine when a primary path is at least partially obstructed. According to an embodiment of the invention, the automobile air intake system includes an intake enclosure and a hood having a passageway for providing air from the within the engine compartment to the intake enclosure. Other features and advantages of various aspects of the invention will become apparent with reference to the following detailed description and figures.

BRIEF DESCRIPTION OF THE DRAWINGS

The invention will be described in detail in the following description of preferred embodiments with reference to the following figures wherein.

DETAILED DESCRIPTION

Figure 1:
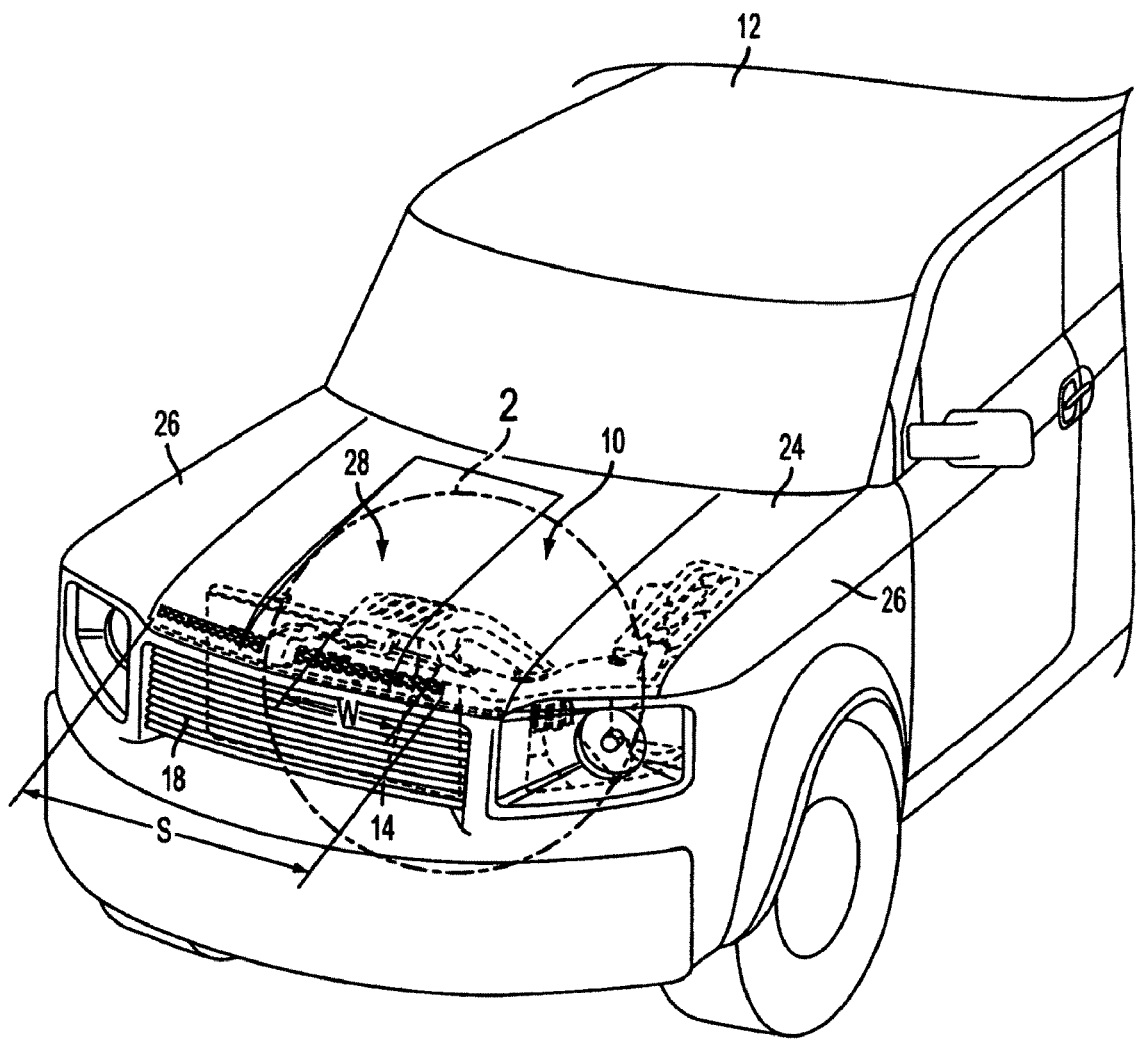
FIG. 1 is a front perspective view of an automobile air intake system according to an embodiment of the invention.

Referring The various aspects of the invention may be embodied in various forms. The following description shows by way of illustration various embodiments in which aspects of the invention may be practiced. It is to be understood that other embodiments may be utilized and structural and functional modifications may be made without departing from the scope of the present invention. Referring now to FIGS. 1-8, an automobile air intake system 10 is shown according to an embodiment of the invention as part of an automobile 12. As shown, automobile air intake system 10 generally includes an air intake enclosure 14 and a flow path 16 (see FIG. 8) to intake enclosure 14, which is generally formed by grille openings 19 through a grille 18, a radiator 20, and a front portion 22 of hood 24 disposed at the front portion of automobile 12. Automobile air intake system 10 provides cooler air from outside the engine compartment to the automobile engine (not shown) while deterring the ingress of particles and water contained in the air from being drawn into air intake enclosure 14.

Figure 2:
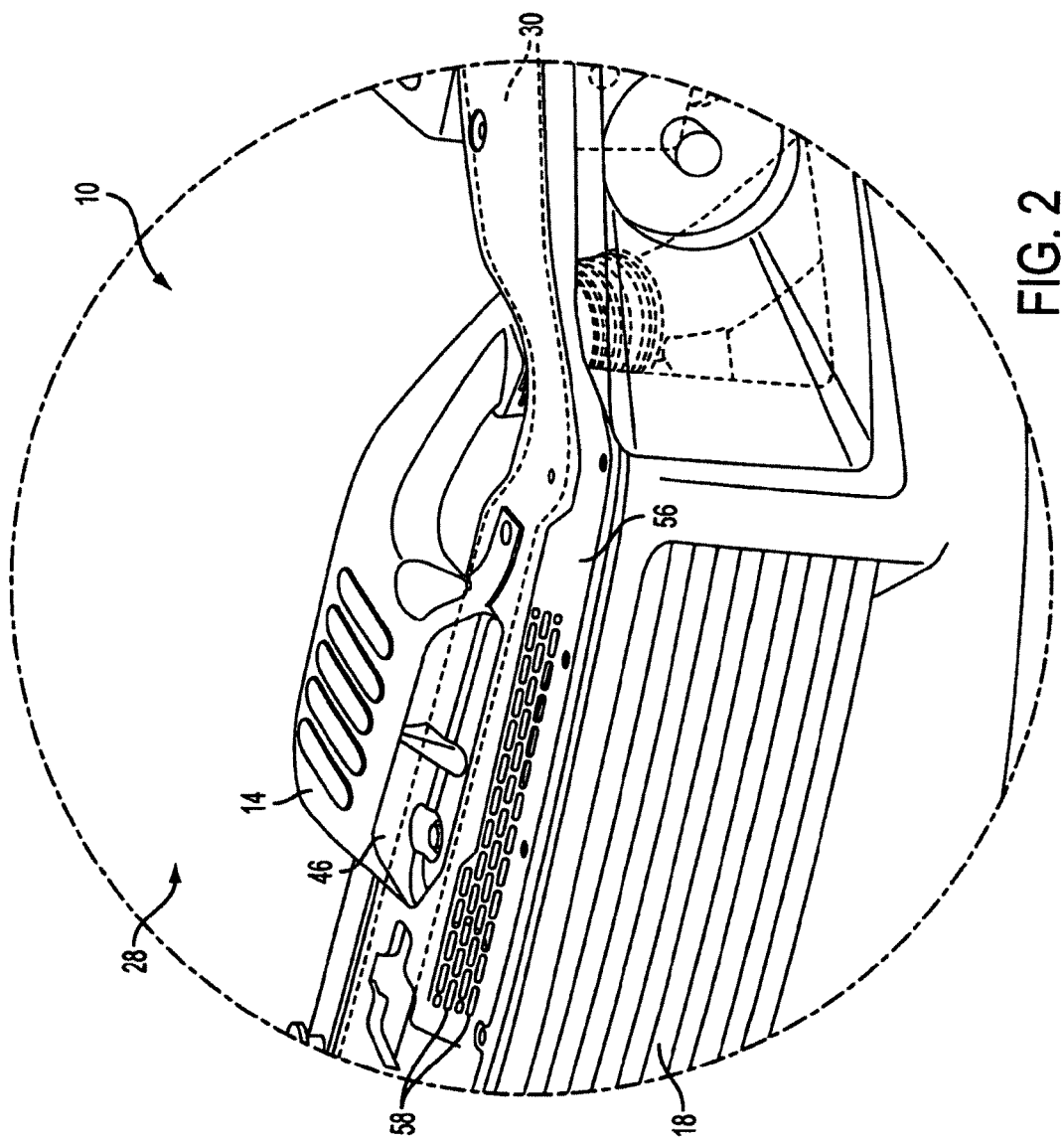
FIG. 2 is an enlarged front right perspective view of Detail 2 of FIG. 1.
Figure 3:
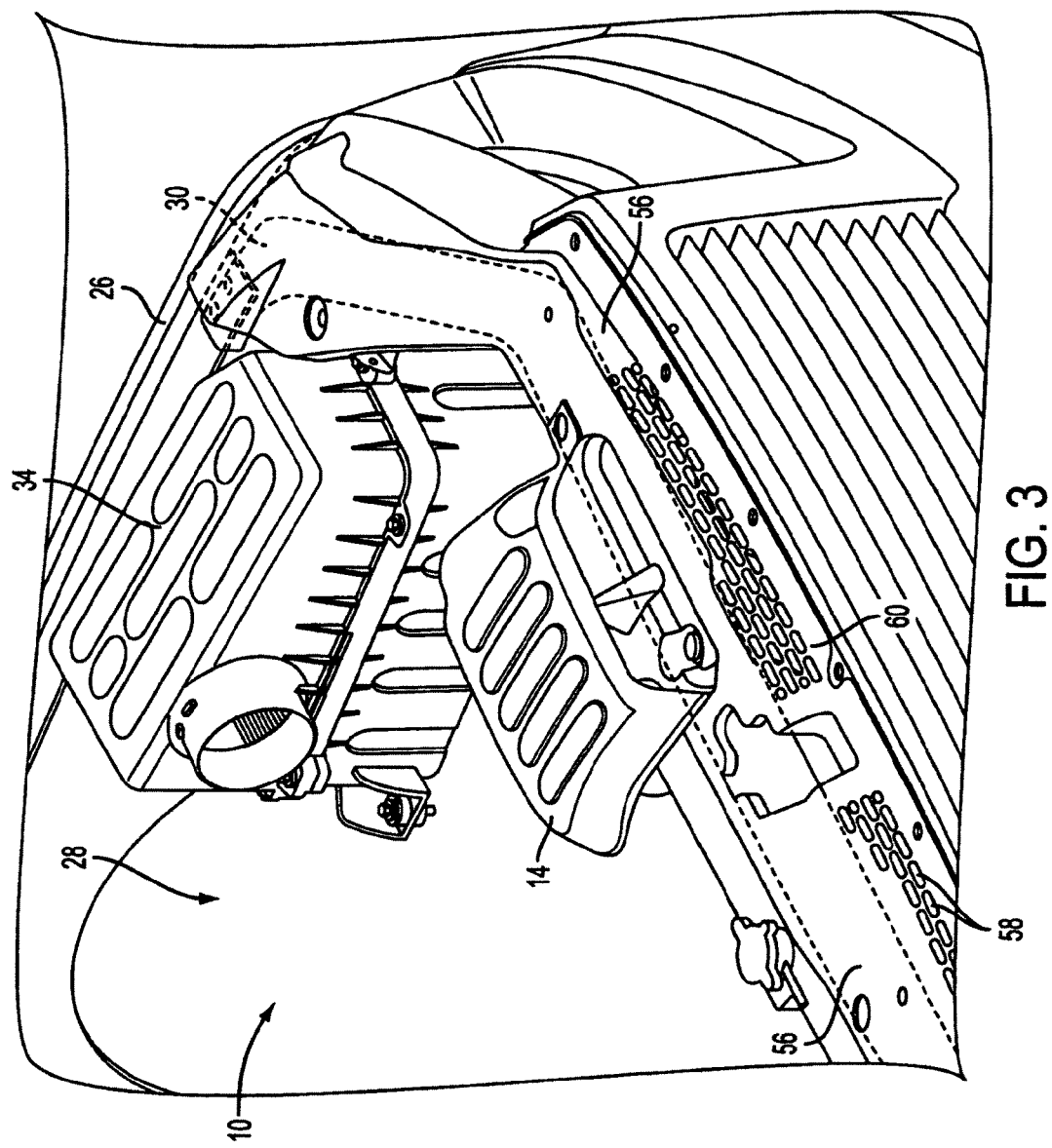
FIG. 3 is a front left perspective view of a portion of the automobile air intake system of FIG. 1 shown with the hood in an open position.
Figure 4:
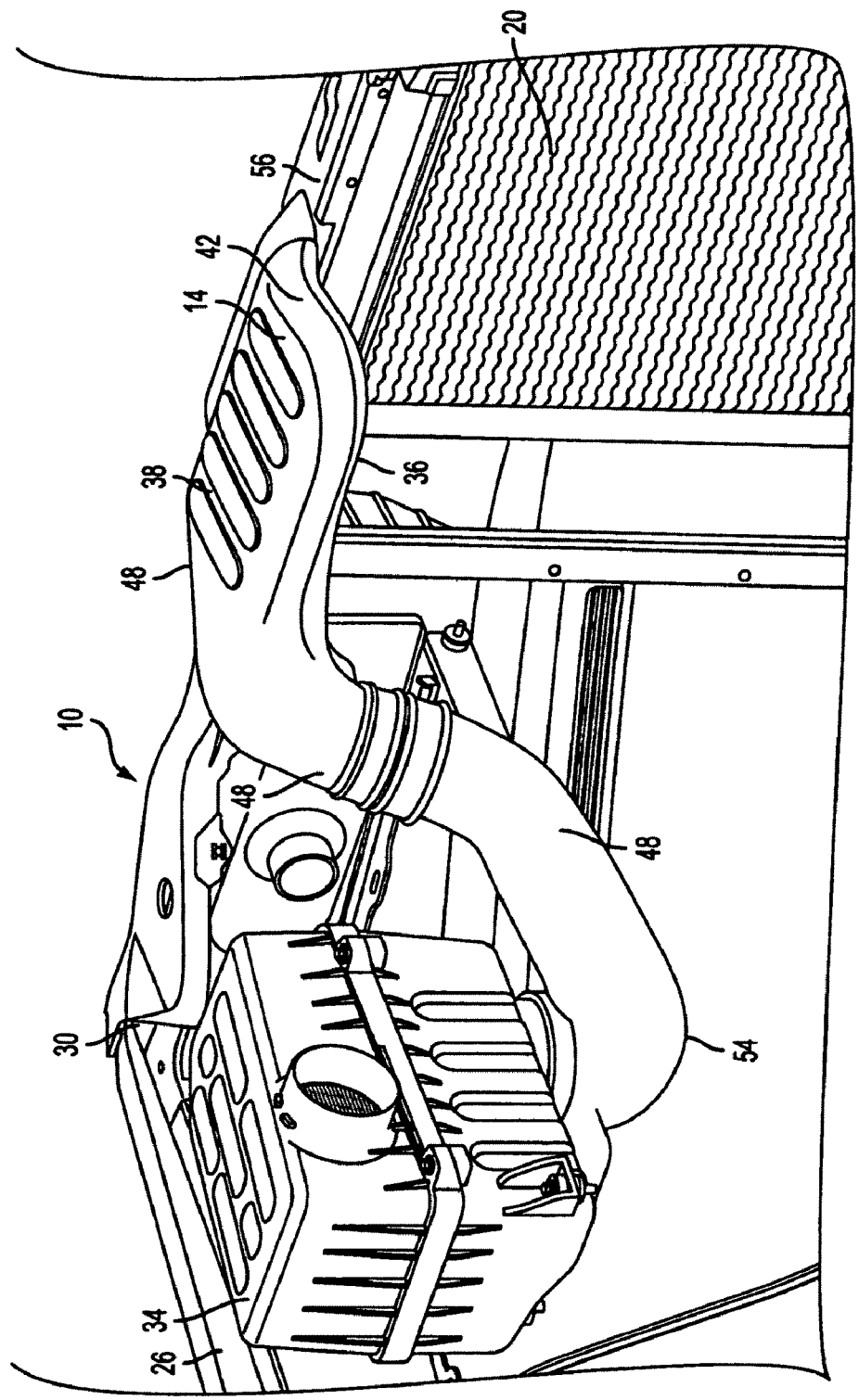
FIG. 4 is a rear perspective view of a portion of the automobile air intake system of FIG. 1 as viewed from within the engine compartment with the hood in an open position.

As shown in FIGS. 1-4, automobile 12 includes a frame 26 forming boundaries of an engine compartment 28. Disposed across the front of engine compartment 28 is a transverse frame element commonly referred to as the bulkhead 30. Bulkhead 30 is generally a structural frame member, such as a U-shaped steel bar, that traverses a front region of the engine compartment along a top region of the compartment. Air intake enclosure 14 is disposed above bulkhead 30 and can be attached directly to the bulkhead, to a bulkhead cover 56, and/or to other structures via hardware such as bolts and/or other common connectors. As shown in FIG. 4, air intake enclosure 14 provides an air passageway to air filter unit 34, which further channels filtered air to the automobile engine (not shown).

Figure 5:
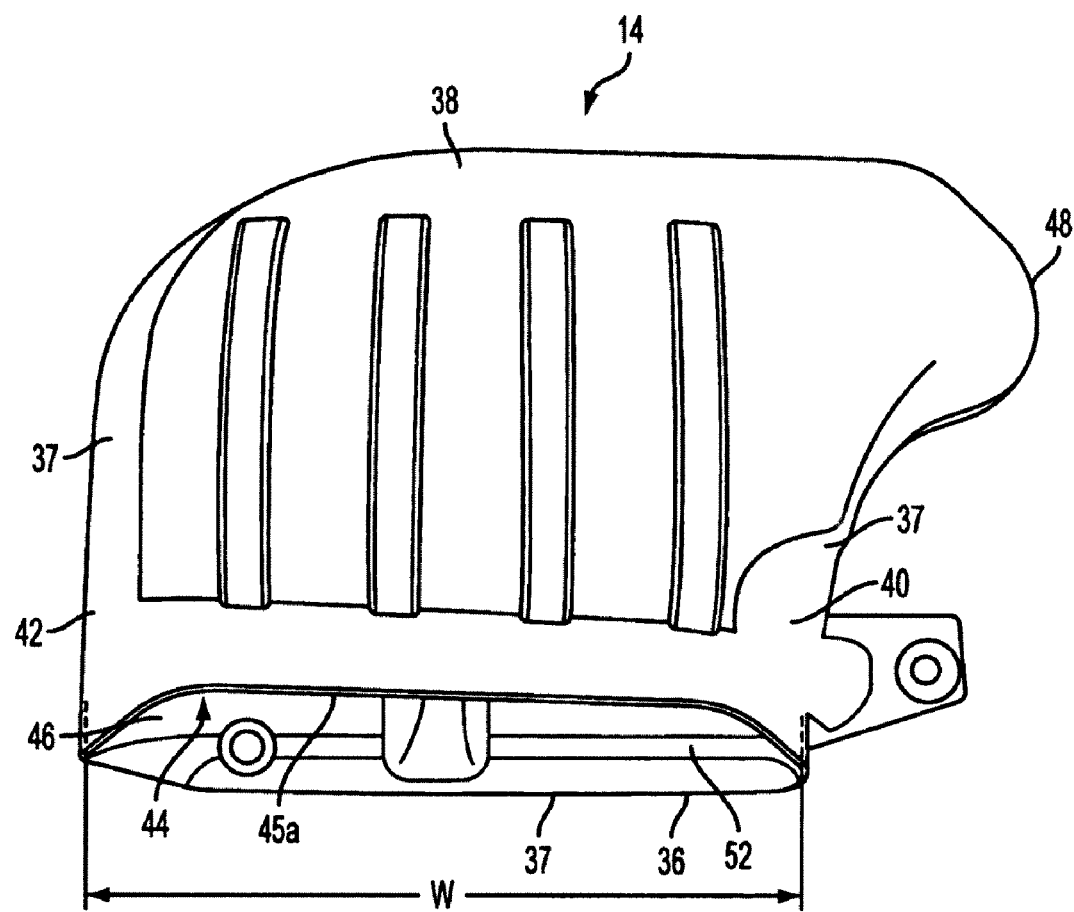
FIGS. 5 and 6 are top and side views respectively of the air intake enclosure of FIG. 1.
Figure 6:
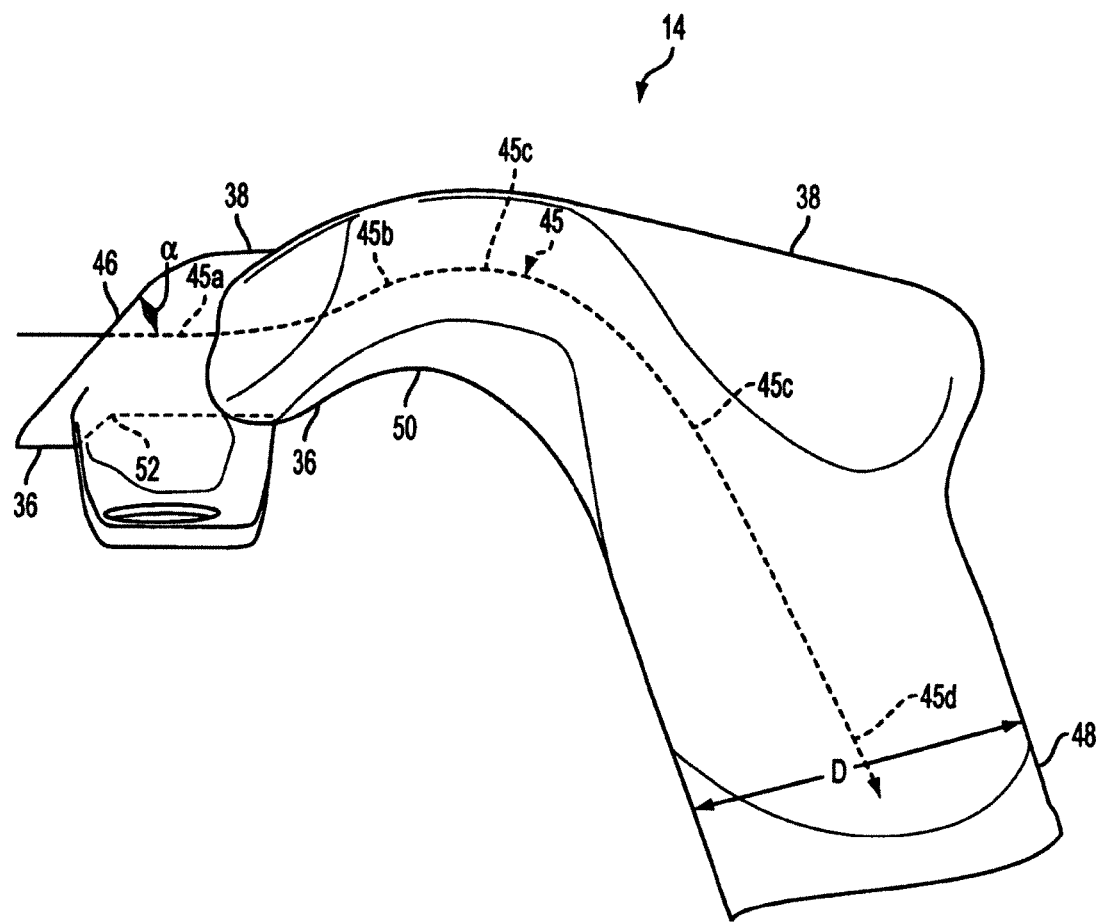
Figure 7:
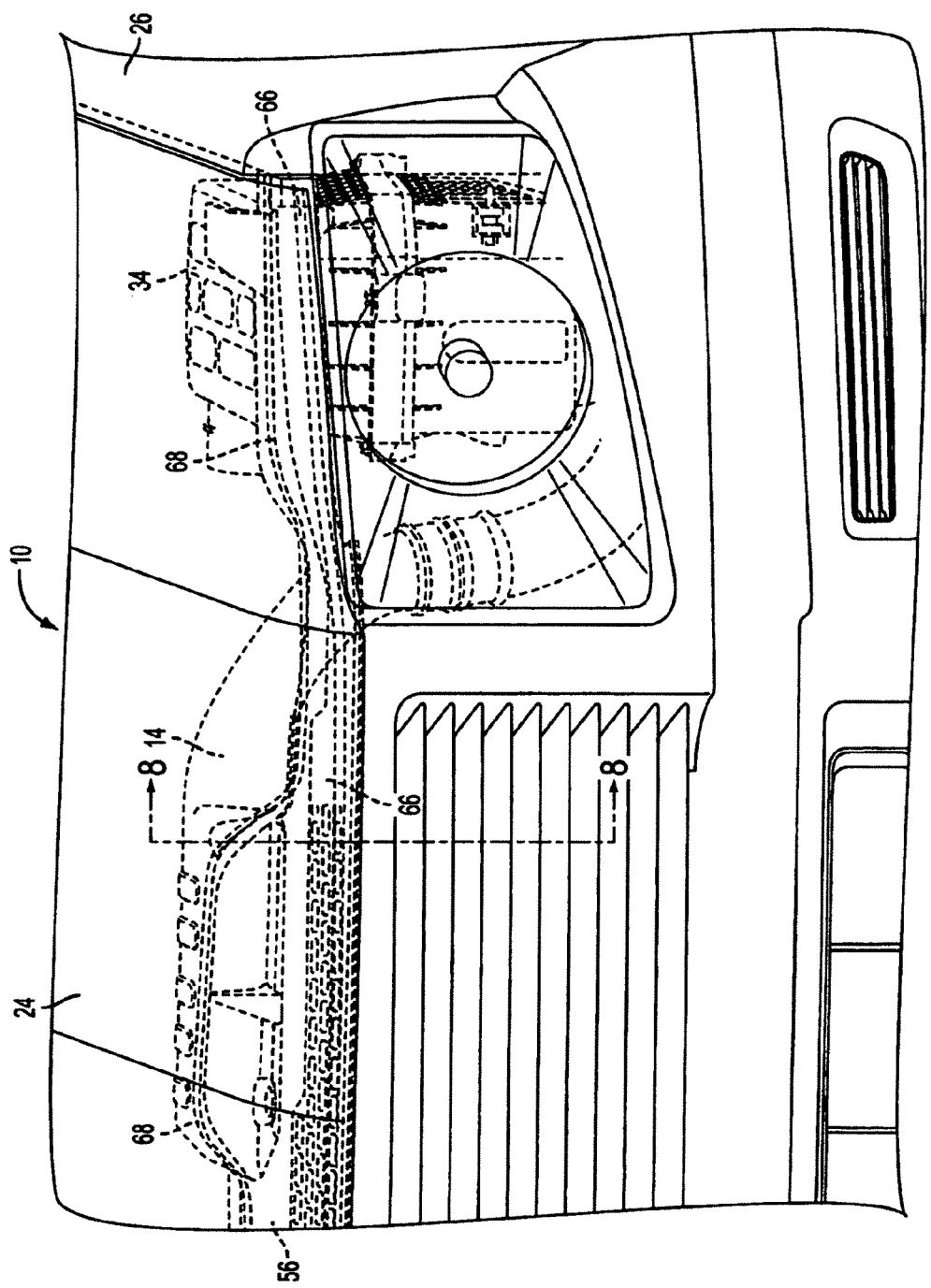
FIG. 7 is a front view of a portion of the automobile air intake system of FIG. 1 shown with the hood in a closed position.

Referring specifically to FIGS. 5 and 6, air intake enclosure 14 generally includes walls 37, which together form a channel 44 for channeling air along airflow path 45 to air filter unit 34. At a front portion of intake enclosure 14, walls 37 may include a base 36 opposed by a top 38, and a pair of opposing sidewalls 40 and 42. Front portions of base 36, top 38 and sidewalls 40 and 42 form an intake port 46 generally facing toward the front of automobile 12. Intake port 46 is preferably oblique from base 36 and/or from the cross-section of airflow path 45 to provide an opening that is larger than the cross-section of channel 44 perpendicular to airflow path 45 at intake port 46. For instance, as shown in FIG. 6, intake port 46 may form an acute angle .alpha. with airflow path 45 and/or base 36 at point 45a through intake port 46. Acute angle .alpha. is preferably between about 5 degrees and 85 degrees, and is more preferably between about 30 degrees and 60 degrees. Even more preferably, acute angle .alpha. is about 45 degrees, which provides an intake port 46 having a larger area than the cross-section of channel 44 perpendicular to airflow path 45. As discussed further below, this reduces the airflow velocity at intake port 46 to reduce the possibility of drawing in water and particles in the air. As shown, base 36, top 38 and sidewalls 40 and 42 curve together along airflow path 45 to form circular tube 48 extending toward air filter unit 34.

The cross-sectional area of channel 44 perpendicular to airflow path 45 preferably tapers down from a relatively large cross-sectional area at point 45a, as created by width W and the channel height at that point, to a smaller cross-sectional area based on the diameter D of tube 48 leading to air filter unit 34. Preferably, the cross-sectional area of channel 44 perpendicular to airflow path 45 at point 45a has an effective diameter that is 10 percent or more than the effective diameter of the cross-sectional area of the channel along tube 48 perpendicular to airflow path 45 at point 45d. This provides a lower air velocity at intake port 46 than along tube 48 for a given volumetric flow rate through channel 44. For example, the effective diameter at point 45a may be about 99 cm$^2$ and the effective diameter at point 45d may be about 88 cm$^2$. As discussed later in concert with FIG. 8, less particulate and/or water content is drawn into air intake enclosure 14 at lower air velocities through intake port 46, such as permitted via the relatively large cross-sectional area at point 45a, than would be drawn in with higher air velocities at the intake port, such as if the velocity at point 45d due to its smaller cross-sectional existed at point 45a. Air intake enclosure 14 is preferably a molded plastic unit as is known in the art, which is airtight, generally lightweight, and robust, yet inexpensive to manufacture; however, it can be formed via other known manufacturing technologies, such as from an assembly of metal or plastic components.

Figure 8:
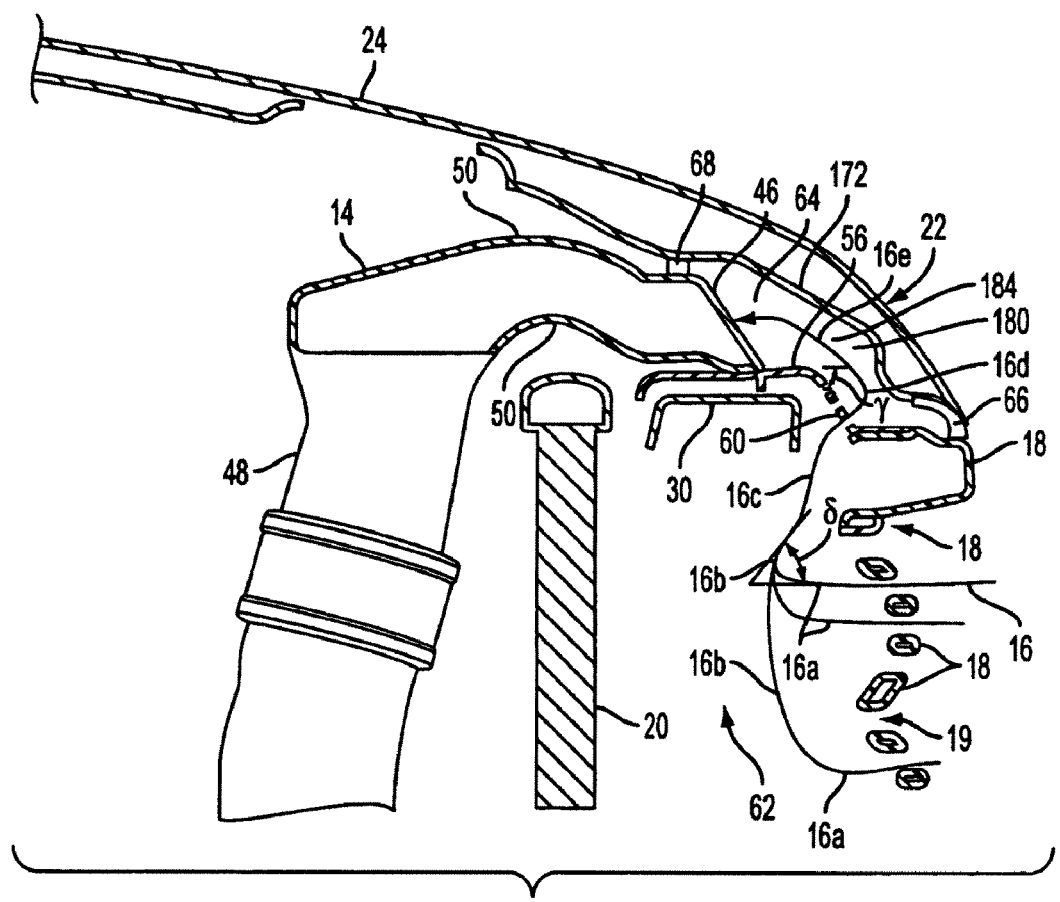
FIG. 8 is a partial cross-sectional view taken through line 8-8 of FIG. 7.
Figure 9:
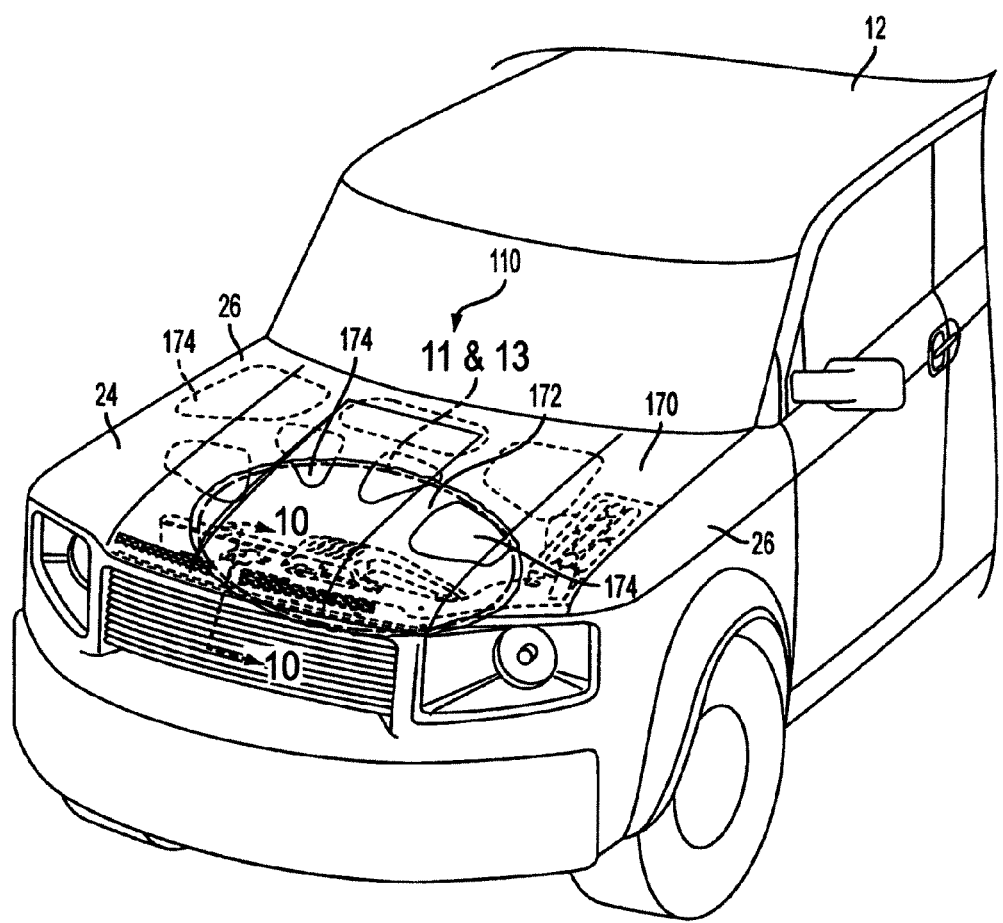
FIG. 9 is a front perspective view of an automobile air intake system according to another embodiment of the invention.

Air intake enclosure 14 is shaped and adapted to extend over radiator 20, which is preferably aligned underneath a high point or apex 50 of base 36 of air intake enclosure 14 (see FIG. 8). Thus, as shown in FIG. 6, base 36 and airflow path 45 at point 45b are inclined as they extend from intake port 46 to base apex 50. This encourages particles, objects, water, etc, to exit channel 44 via intake port 46, which may have been drawn into or fallen into channel 44. Stated another way, base apex 50 forms a gravity bias at the front of intake enclosure 14 to discharge particles, moisture, or objects out of the front of intake enclosure 14 through intake port 46. To further encourage such items to leave channel 44, base 36 forms a step 52 disposed within intake port 46. In the event objects such as tools fall through intake port 46 into channel 44 when the hood is in an open configuration, step 52 encourages these objects to exit channel 44 via intake port 46.

Placing radiator 20 below base apex 50 permits the radiator to be disposed behind bulkhead 20. As discussed later along with FIG. 8, radiator 20 is preferably disposed rearward of bulkhead 30, rather than aligned with or in front of bulkhead 30, which is most common in conventional vehicles. The rearward offset of radiator 20 from bulkhead 20 can reduce turbulence along flow path 16, reduce the absorption of heat from radiator 20 by intake air, and provide space for intake port 46 on top of bulkhead 30 by allowing bulkhead 30 to be lower than the top of radiator 20.

As shown in FIG. 6, base 36, channel 44 and airflow path 45 are preferably angled downward extending from base apex 50 toward air filter unit 34 along tube 48, as shown by points 45c and 45d. A bottom point 54 may exist along tube 48 prior to connecting with air filter unit 34 (see FIG. 4), which allows any objects or moisture drawn into channel 44 to collect for withdrawal in concert with air filter changes and/or to act as a fluid trap. Optionally, a drain hole (not shown) may be formed in tube 48 at bottom point 54 to permit the drainage of any moisture drawn into channel 44.

As shown in FIGS. 2, 3 and 8, a bulkhead cover 56 is disposed on top of bulkhead 30 and is preferably mounted substantially flat on top of bulkhead 30. Bulkhead cover 56 extends forward from the top of bulkhead 30 to the top of grille 18 and includes a plurality of holes 58 formed therethrough, which form a mesh or screen 60. Screen 60 forms an air permeable barrier across flow path 16 for inhibiting moisture droplets and relatively large particles from entering air intake enclosure 14 without significantly affecting the flow rate of the incoming air. Screen 60 should have holes that are small enough to screen out most debris, but not too small to significantly restrict airflow. For example, screen 60 may include holes having an area of about 140 square millimeters, which will prevent the ingress of most debris and permit good airflow therethrough. The moisture droplets and particles may be from water or particles splashed or thrown on the front of automobile 12, as well as from moisture or particles carried by intake air. Screen 60 provides an initial deflection of these items, which can prevent the intake system from being clogged or requiring premature replacement of the air filter (not shown).

Preferably, screen 60 extends between bulkhead 30 and grille 18 at an angle from horizontal to encourage any particles or moisture collected on screen 60 to travel downward and fall from screen 60. More preferably, as shown in FIG. 8, screen 60 is angled downward from bulkhead cover 56 to grille 18 at a downward angle γ from the top of bulkhead cover 56, which encourages particles or moisture collected on screen 60 to travel downward away from radiator 20 and avoid being drawn through the radiator. Downward angle γ is preferably between about 15 degrees and 85 degrees, and more preferably between about 30 degrees and 60 degrees. Even more preferably, angle γ is about 45 degrees. Downward angle γ in these ranges enables screen 60 to deflect items splashed or thrown toward the flow path 16 due to the small angle of incidence at which such items are likely to encounter screen 60 when angled downward at angle γ.

Referring specifically to FIG. 8, flow path 16 is illustrated with respect to various components of air intake system 10. As shown, radiator 20 is disposed rearward in the vehicle of bulkhead 30 beneath base apex 50. In conventional vehicles, the radiator 20 is superimposed beneath the bulkhead 30 relatively close to grille 18. Offsetting radiator 20 entirely rearward of bulkhead 30 provides a relatively large frontal space 62 compared with placing radiator 20 directly below bulkhead 30. Since radiator 20 is not superimposed beneath bulkhead 30, it provides flexibility in design to place bulkhead 30 lower in the engine compartment than conventional arrangements, such as generally even with or entirely below the top of radiator 20. (This also provides space for intake port 46 without significantly increasing the height of hood 24, if at all). Large frontal space 62 provides a pocket of air that is less turbulent than conventional arrangements, which reduces the mixing of intake air with warmer air proximate radiator 20. As such, cooler exterior air, which is denser and more efficient for combustion than warmer air, can be provided to air intake enclosure 14 and ultimately to the automobile engine (not shown). Frontal space 62 also provides a location for water disposed in the area of the intake path to drain down away from intake port 46.

As shown in FIG. 8, air is drawn into air intake enclosure 14 along flow path 16. The air flows in from the front of vehicle 12 through gaps 19 in grille 18. When vehicle 12 is being operated under average driving conditions, air is forced into frontal space 62 in a generally rearward direction along portion 16a of flow path 16 due to forward motion of vehicle 12. Radiator 20 and/or other components of vehicle 12 partially dam the air, which causes the air pressure to increase in frontal space 62. This encourages the air to turn about 90 degrees or more from its rearward path at portion 16b to flow upward along portion 16c. As such, air flowing through grille 18 turns such that it flows at an angle δ at portion 16b from its entry path to flow upward and forward along portion 16c through screen 60. Preferably, angle δ is about 15 degrees to 85 degrees, and more preferably is about 45 degrees. Channeling intake air to turn angle δ encourages moisture droplets and particles suspended in the air along portion 16a to continue rearward rather than being drawn along the relatively sharp turn of 16b along flow path 16.

The engine intake system provides vacuum via intake port 46 of air intake enclosure 14 to further encourage air from frontal space 62 to turn along portion. 16b and flow upward along portion 16c. Vacuum from the intake system may be the primary moving force to encourage air to move along flow path 16 when the vehicle is not moving or is moving rearward. Once intake air is drawn in through screen 60 along portion 16c, the inside of hood frame 172 at a forward portion of hood 24 channels the air to turn it rearward at portion 16d and to channel it toward intake port 46 along portion 16e. The rearward turn at portion 16d further encourages remaining moisture droplets or particles to drop out of the air, such as by collecting on the inside of hood frame 172. Thus, flow path 16 may be a serpentine path that is generally S-shaped in the vertical plane, which encourages suspended particles and moisture droplets drawn through grille 18 to continue rearward toward the radiator based on their greater mass and momentum in comparison with the air. Flow path 16 further encourages remaining particles and moisture droplets to collect along screen 60 or the inside of hood frame 172. Thus, the amount of moisture and particulate drawn into the air intake system is reduced compared with non-winding intake paths.

This arrangement provides advantages over simpler winding intake paths, as the large rearward momentum of the particles and moisture droplets entering grille 18 at normal vehicle driving speeds encourages their separation from the air. To reduce particulate and moisture content further, screen 60 is disposed to capture particles and liquid droplets that may continue along portion 16c of flow path 16 or that may splash upward along the air path. The serpentine flow path 16, which is generally S-shaped as viewed in the vertical plane, can eliminate a large amount of moisture droplets and particles from intake air, which is enhanced by screen 60.

In addition to the vertical channeling of intake air as illustrated by the general S-shape shown in FIG. 8, flow path 16 also channels a large portion of intake air horizontally to further reduce the amount of particulate and moisture droplets further. As shown in FIG. 1, screen 60 generally extends across grille 18 a distance S that is much wider than the width W of intake port 46. Thus, as shown in cross-section in FIG. 8, a generally horizontal bulkhead channel 64 is formed between the top of grill 18, bulkhead cover 56, screen 60, and the inside of hood frame 172. After intake air is drawn through screen 60, depending on its lateral relation to intake port 46, it may be channeled laterally along bulkhead channel 64. Within bulkhead channel 64, the intake air is channeled laterally to turn an angle of about ninety degrees for channeling it toward air intake port 46.

Seals 66 and 68 are preferably disposed fore and aft of bulkhead channel 64, which may be attached to the underside of hood frame 172, to provide a generally airtight flow path 16 extending laterally toward intake port 46. Seals 66 and 68 are preferably made from compressible materials, such as rubber or foam, which can provide tight seals between the inside of hood frame 172 and grille 18, the top of intake air enclosure 14, and bulkhead cover 56. Tight seals enhance the effectiveness of air intake system 10 by ensuring the majority of intake air travels via airflow path 16 into intake port 46. Other seals, such as tongue-and-groove configurations between the inside 172 of hood 24 and bulkhead cover 56 or other structures, are also contemplated for generally sealing bulkhead channel 64. Vacuum from the engine provides low air pressure inside air intake enclosure 14, which encourages intake air to travel along bulkhead channel 64 into intake port 46. Higher pressure within intake space 62 during forward movement of vehicle 12 further encourages intake air to travel along bulkhead channel 64 into intake port 46 due to the width of grille 18 and screen 60 compared with intake port 46. Thus, although a portion of intake air may travel generally vertically up through screen 60 directly into intake port 46, a significant portion of intake air may travel laterally within bulkhead channel 64 along bulkhead cover 56 from portions of screen 60 that are not disposed directly in front of intake port 46. Such lateral channeling of much of the intake air further encourages moisture droplets and particles to drop out of the intake air.

Various aspects of air intake system 10 combine together to reduce the quantity of moisture droplets and particulate in intake air. Reducing the amount of moisture droplets and particles in intake air increases the life of the air filter disposed in air filter unit 34, provides cleaner air to the intake system and engine, and provides cooler outside air for combustion, which can greatly increase the efficiency of the engine (not shown). Turns 16b and 16d of the vertical portion of flow path 16, combined with the lateral channeling of air through bulkhead channel 64 portion of flow path 16 and the low air velocity along flow path 16, encourages many particles and moisture droplets to exit the intake air prior to entry through intake port 46. Due to greater length of bulkhead channel 64 compared with the width of intake port 46, the velocity of air being drawn through screen 60 can be lower than the velocity of air entering through intake port 46. As discussed above along with FIGS. 5 and 6, the intake velocity at intake port 46 is kept relatively low compared with the velocity along tube 48, which even further reduces the ingress of moisture and particles. These aspects combine together to greatly reduce the ingress of moisture and particles into air intake system 10.

In addition to providing cooler and cleaner air during normal driving condition provided by the aforementioned aspects of intake air system 10, which can be practiced individually or together, air intake system 10 further reduces the possibility of drawing moisture and particles into the intake system during more extreme driving conditions. The placement of intake port 46 as high as possible against the inside of hood 24 reduces the likelihood of water entering the intake system during extreme driving conditions, such as through heavy rain storms or high-standing water. As long as air can enter flow path 16, such as via the top portion of grille 18, cooler exterior intake air can be provided to the intake system that has reduced moisture and particulate content. Even during these extremely wet conditions, the vertical and lateral channeling of air along airflow path 16, the low intake air flow rate through airflow path 16, and the screening of the air through screen 60 reduce the likelihood of water droplets being drawn into air intake system 10.

Referring now to FIGS. 9-12 along with FIGS. 1-8, an automobile air intake system 110 according to another embodiment of the invention is shown. Intake system 110 provides an alternate intake path for conducting air contained within engine compartment 28 to intake port 46 in the event a primary intake path to exterior air is unavailable or partially blocked. Automobile air intake system 110 generally includes the aspects and preferences of air intake system 10 discussed above, except regarding the alternate intake path. Although air intake system 110 generally includes the aspects and preferences of intake system 10, aspects of air intake system 110 related to an alternate intake path may be practiced apart from the aspects and preferences of air intake system 10. Further, the alternate intake path aspects of system 110 may be practiced as a primary or sole intake path for providing air from an engine compartment to an engine.

Figure 10:
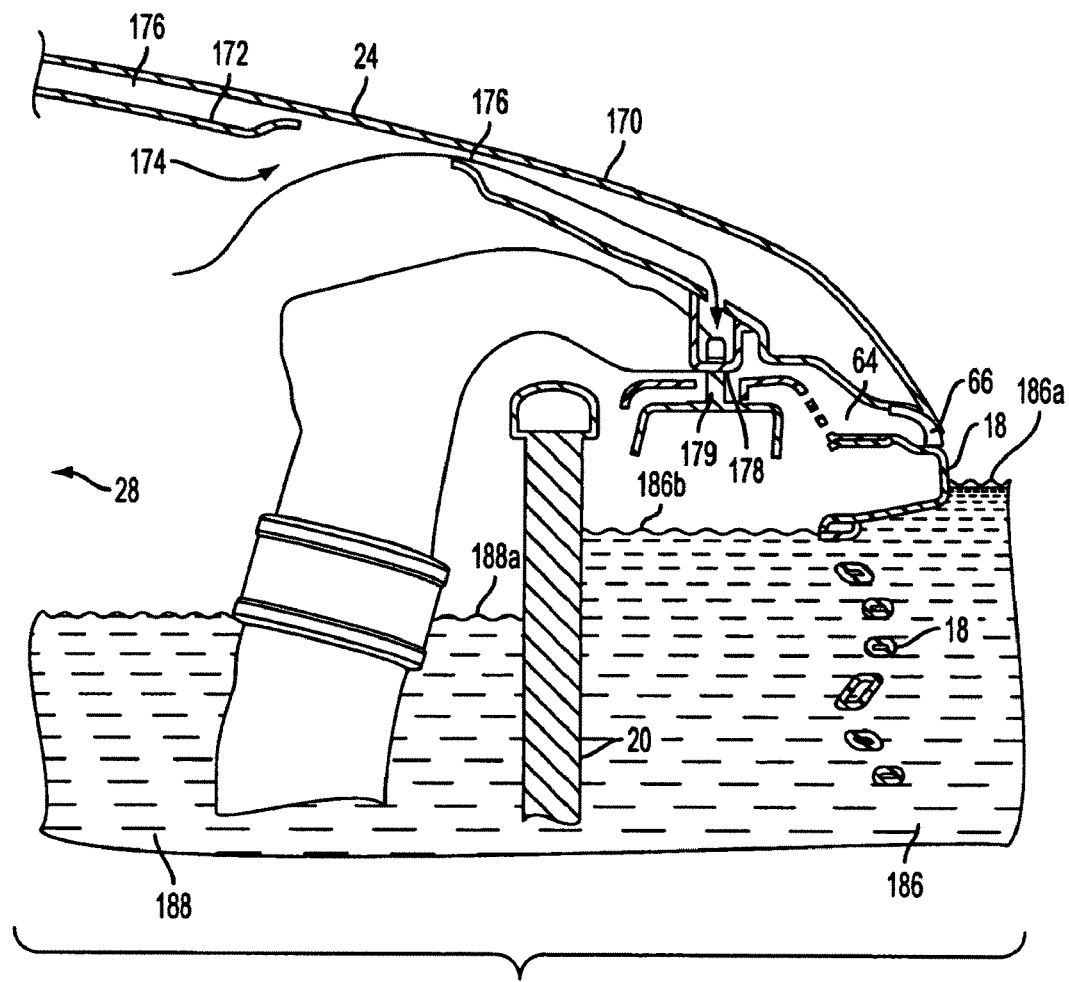
FIG. 10 is a partial cross-sectional view taken through line 10-10 of FIG. 9.

In addition to the features disclosed along with embodiment 10, automobile intake system 110 generally includes an air intake path within hood 24 that extends between engine compartment 28 and bulkhead channel 64. As shown in FIG. 10, hood 24 includes an outer skin 170 that is generally uninterrupted, and a hood frame 172 spaced apart from and attached to the underside of hood skin 170. Hood frame 172 forms a plurality of intake orifices 174 generally disposed in the central region of the hood 24 for drawing in air from within engine compartment 28. Gaps between hood skin 170 and hood frame 172 form one or more air passageways 176 for conducting air from within engine compartment 28 via intake orifices 174 to an exit port 178, which feeds into bulkhead channel 64. As shown, exit port 178 may be a latch hole through hood frame 172 used to engage a latch 179 when hood 24 is in the closed position. Passageways 176 provide an alternate intake path from inside the engine compartment to bulkhead channel 64, which leads to intake port 46. Thus, in the event the primary airflow path 16 providing exterior air to intake port 46 is partially or fully blocked, air within engine compartment 28 may be channeled into the engine (not shown) to keep it running. This can be a great advantage for unexpected emergency conditions, such driving into deep flood waters.

Figure 11:
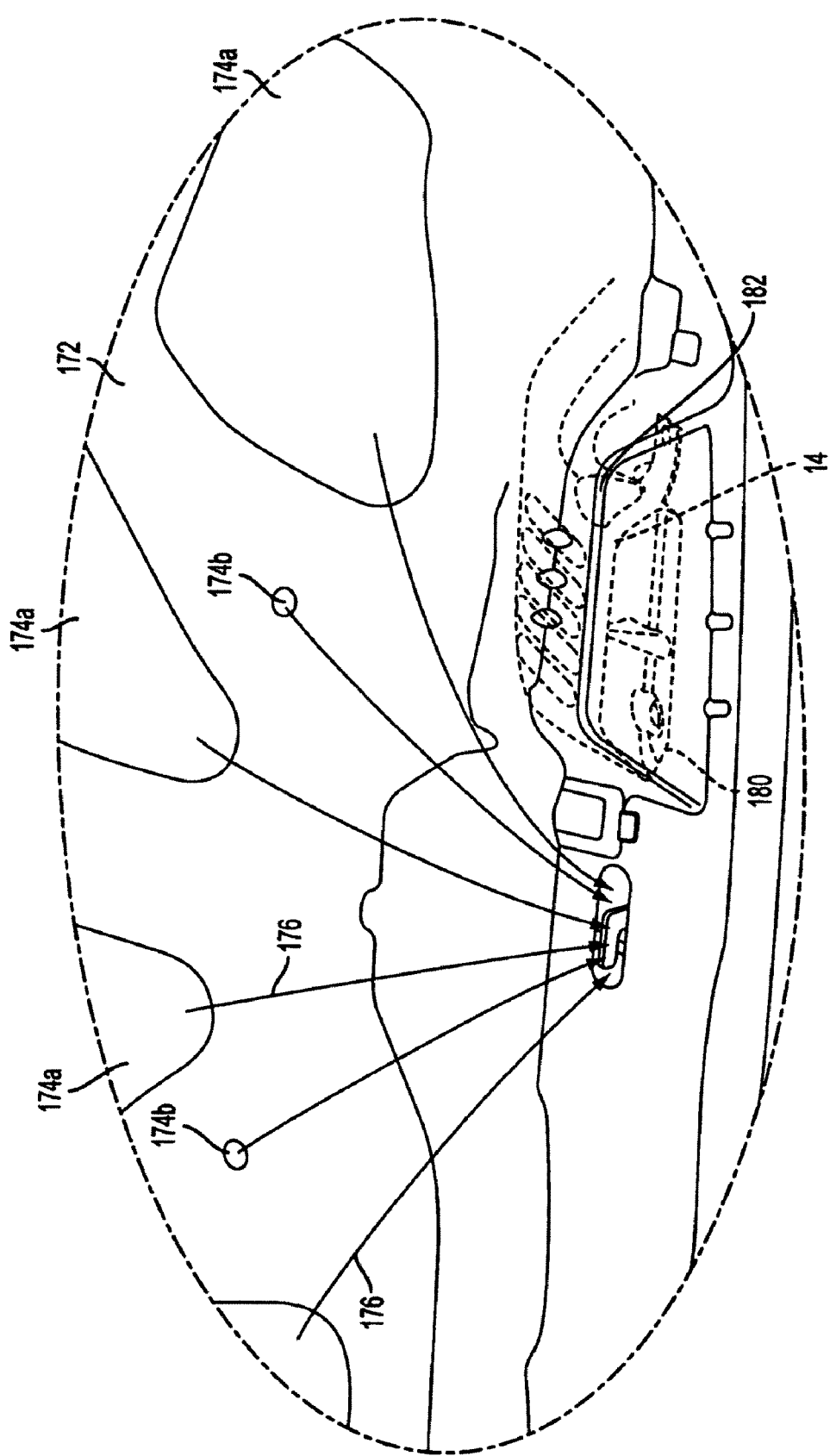
FIG. 11 is a perspective view of Detail 11 of FIG. 9 showing the hood frame with the hood skin removed.

FIG. 11 is a top perspective view of hood frame 172 with hood skin 170 removed to show the passageways 176 within hood 24 for conducting air from engine compartment 28 via intake orifices 174 to exit port 178. Intake orifices 174 include large orifices 174a, which can serve the dual purpose of reducing the weight of hood 24 by eliminating elements of hood frame 172 and providing large airflow into air passageways 176, and small orifices 174b. The small orifices can be strategically formed within hood frame 172 to provide air intake advantages. For instance, small orifices 174b may be placed nearer to exit port 178 than larger orifices 174a to improve flow through hood passageways 176 without significantly affecting the strength of hood frame 172. In comparison with smaller orifices 174b, the placement of large orifices 174a may be more significantly governed by hood frame strength considerations. In another example, small orifices 174b may be placed in desirable intake positions within engine compartment 28, such as at high points in hood 24 or in positions away from concentrations of engine heat.

Figure 12:
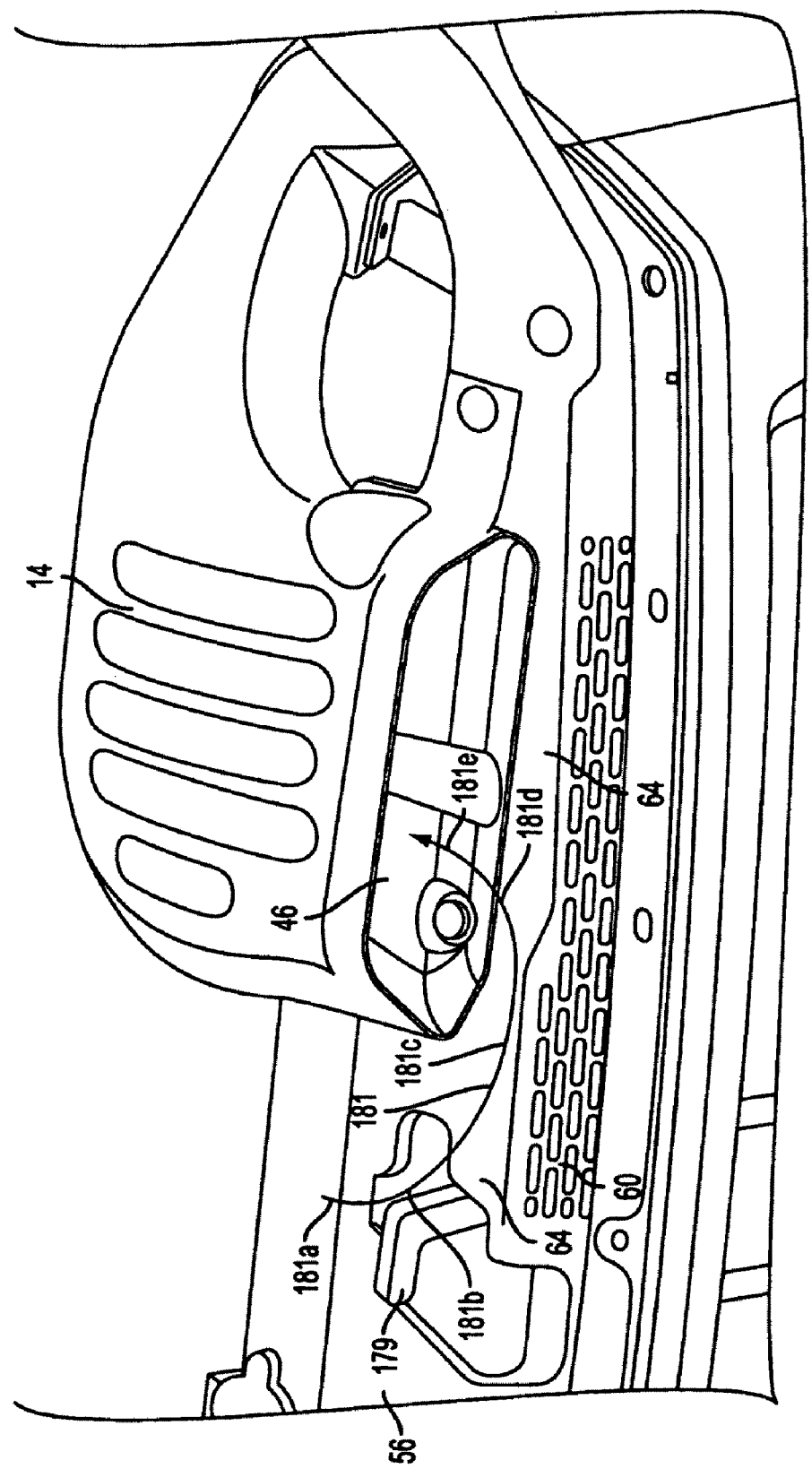
FIG. 12 is a perspective view of a portion of the automobile air intake system of FIG. 9 showing the air flow into the air intake enclosure.

Hood frame 172 shown in FIG. 11 includes a bulge 182 that, on its opposite side, forms an intake enclosure cavity 180 on the underside of the hood frame 172. As shown in FIG. 8, cavity 180 receives a top portion of intake enclosure 14 and provides a space 184 in front of intake port 46, which permits intake air entering intake port 46 to have a relatively slow velocity compared with the velocity along tube 48 of intake enclosure 14. As shown in FIG. 12, air exiting exit port 178 enters bulkhead channel 64 and is channeled into intake port 46 via cavity 180.

Passageways 176 shown in FIG. 11 are preferably used to provide air to the automobile engine on condition the primary path, such as flow path 16, is at least partially blocked. For example, suppose a vehicle suddenly encounters floodwaters 186 with a water level at a depth 186a up to the height of grille 18 or greater as shown in FIG. 10. The water blocks airflow at portion 16a of flow path 16 from providing air to bulkhead channel 64 and thereby to intake port 46. As such, the automobile engine (not shown) on an automobile without intake system 110 may stall and/or draw in water, and the vehicle driver may become stranded. With an intake system such as automobile intake system 110, intake port 46 may draw air from inside engine compartment 28 via passageways 176, exit port 178 and bulkhead channel 64 to thereby permit continued operation of the engine (not shown).

Because intake orifices 174 are disposed at the top of engine compartment 28 within hood 24, the air drawn in is not proximate to the water 188 disposed within engine compartment 28. Further, because radiator 20, grille 18, and other front portions of the automobile act as dam while the automobile moves forward, the level 188a of water within the engine compartment should be lower than the level of water 186b in front of radiator 20 or the level of water 186a in front of the vehicle. Thus, the automobile engine (not shown) can continue to operate through the high water levels by drawing air through air passageways 176, exit port 178 and bulkhead channel 64 into intake port 46.

In addition to providing an alternate path for intake air, automobile intake system 110 provides winding passageways to inhibit the intake of moisture droplets and particles into intake enclosure 14. The large sizes of the intake orifices 174 in hood frame 172 and the passageways 176 within the hood allow the air to be withdrawn from the engine compartment at a relatively slow velocity compared with the velocity through intake enclosure 14. The inside of hood 24 along passageways 176 may act like baffles to condense and capture moisture contained within the intake air. Further, the flow channel through exit orifice 178 and bulkhead channel 64 encourages moisture and particles to be removed from the intake air in a manner similar to flow path 16 by turning the air as it leaves exit orifice 178 and enters bulkhead channel 64.

During normal operation of automobile 12 in which flow path 16 is not obscured, little if any air will be drawn through passageways 172 from engine compartment 24. This is because high pressure in frontal space 62 during forward vehicle motion drives air into bulkhead channel, which will not favor and may likely discourage airflow into bulkhead channel 64 from exit orifice 178. When vehicle 12 is not moving, the path of least resistance will likely be through airflow path 16 rather than via exit orifice 178, because the cross-sectional flow area through exit orifice 178 is small compared with airflow path 16. As such, passageways 176 require a larger pressure differential to draw air therethrough than airflow path 16. During normal operating conditions, air is readily available via the comparably large intake area of flow path 16. However, when flow path 16 becomes partially or fully blocked, the vacuum draw from the engine (not shown) via intake enclosure 14 increases at exit orifice 178 due to restricted air intake, which increases the pressure differential between engine compartment 28 and bulkhead channel 64 to thereby draw air through air passageways 172 and exit orifice 174.

Figure 13:
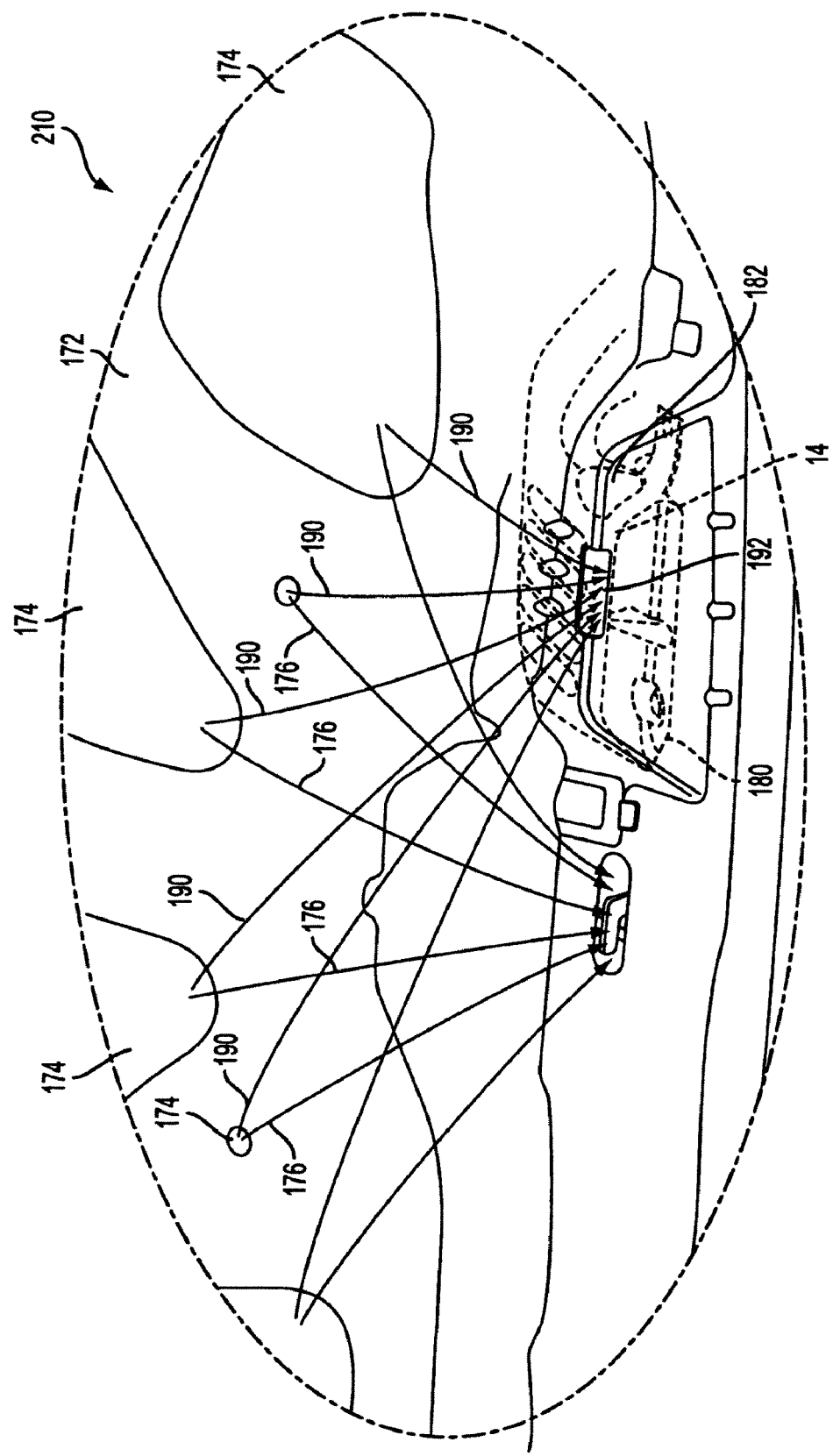
FIG. 13 is perspective view of a portion of an automobile air intake system similar to FIG. 11 according to a further embodiment of the invention showing the hood frame with the hood skin removed.
Figure 14:
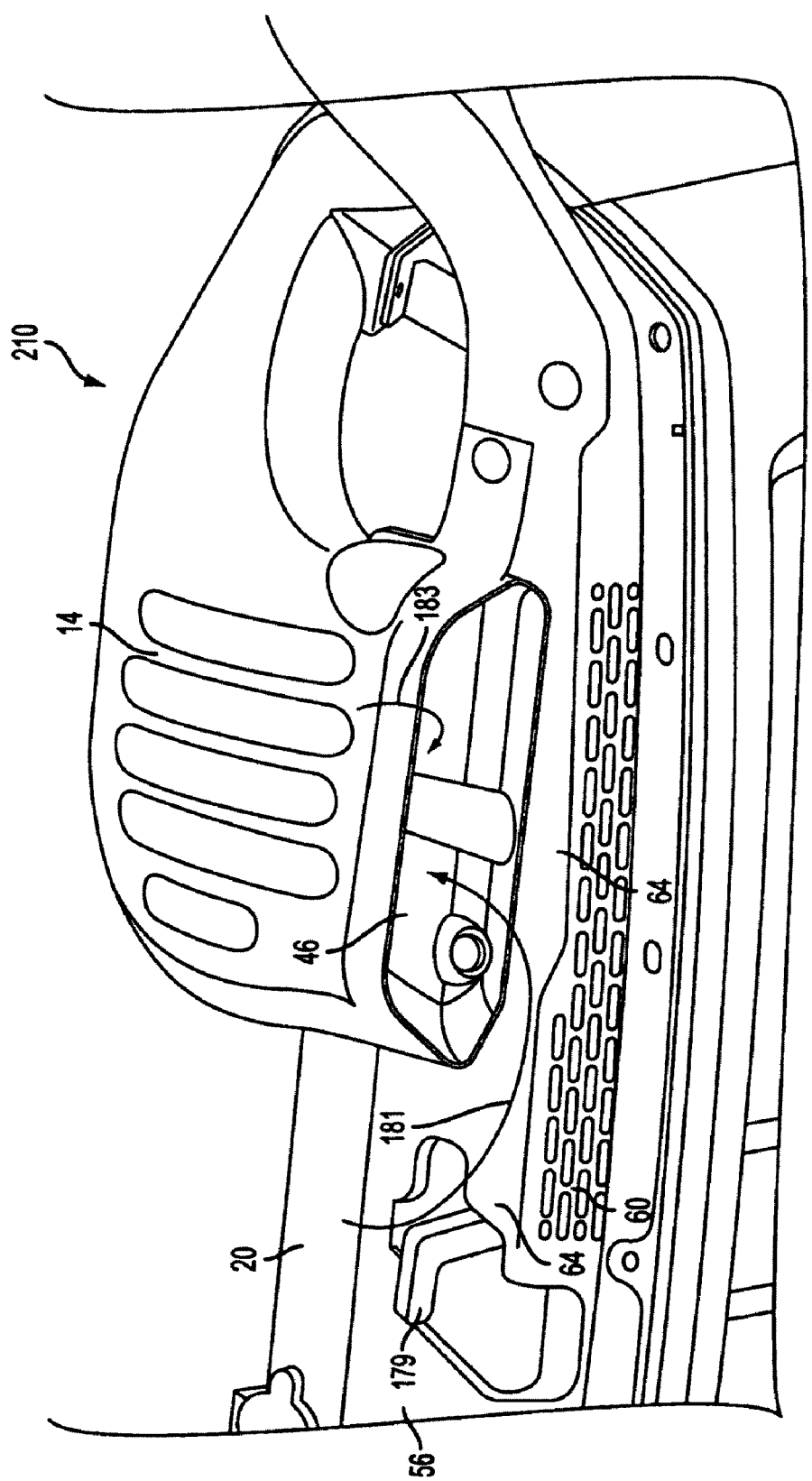
FIG. 14 is a perspective view of a portion of the automobile air intake system of FIG. 13 showing the airflow into the air intake enclosure.

Referring now to FIGS. 13 and 14, an automotive intake system 210 according to a further embodiment of the invention is shown. Automotive intake system generally includes the aspects and preferences of automotive intake system 210, except as relating a second exit orifice within hood skin 172. As shown in FIG. 13, hood frame 172 forms a second exit orifice 192 through bulge 180 and intake enclosure cavity 180 that extends into space 184 in front of intake port 46. This additional port provides increased airflow to intake enclosure 14 from engine compartment 24 on condition flow path 16 becomes partially or fully blocked. Passageways 190 conduct air from the engine compartment 24 to second exit orifice 192 in concert with passageways 176 for conducting air to exit orifice 178. Intake air exits second exit orifice 192 via path 183 shown in FIG. 14 to enter intake port 46. Optionally, one or more valves (not shown), such as spring biased valves, may be provided at exit orifices 178 and 192 to prevent inflow from the alternative passageways during normal operating conditions. When the vacuum draw within bulkhead channel 64 increases due to limited air supply, the optional valves (not shown) may open to provide access to the alternative passageways 172 and 190.

Automobile air intake systems 10, 110 and 210 illustrate various aspects of an automotive air intake system according to the present invention. These systems provide cool exterior air to the engine during normal driving conditions, which may have fewer particles and lower moisture content. In addition, aspects of these systems can reduce the possibility of drawing moisture and particles into the intake system during more extreme driving conditions, such as heavy rain or high water conditions. The aspects of the present invention disclosed in these embodiments can be practiced individually or together. For instance, aspects related to airflow path 16 may be practiced without practicing aspects related to the configuration of air intake enclosure 14. In another example, the alternate intake path aspects of system 110 may be practiced as a primary or sole intake path for providing air from an engine compartment to an engine.

While the present invention has been described in connection with the illustrated embodiments, it will be appreciated and understood that modifications may be made without departing from the true spirit and scope of the invention. In particular, the invention applies to many different types of vehicles and intake configurations.

The invention claimed is:

1. A vehicle air intake system, comprising:
   a bulkhead disposed across a forward portion of an engine compartment;
   a grille disposed forward of the bulkhead;
   a hood disposed over the engine compartment;
   an intake enclosure coupled to the bulkhead, the intake enclosure having an intake port, and wherein the bulkhead, the grille and the hood create a serpentine airflow path to the intake port;
   a screen extending from the bulkhead to the grille transverse to the serpentine airflow path; and
   wherein the screen is angled downward from the bulkhead to the grille.

2. The intake system of claim 1, wherein the screen is angled downward from horizontal at an angle between 15 degrees and 85 degrees.

3. The intake system of claim 2, wherein the screen is angled downward from horizontal at an angle between 40 and 50 degrees.

4. The intake system of claim 1,
   wherein the intake enclosure forms an intake channel for channeling air from the intake port at a first end of the enclosure to an air filter coupled with a second end, the intake channel being inclined as it extends from the intake port, the intake channel inclines from the intake port to an apex and declines from the apex downstream along the intake channel, and the grille, the bulkhead, and the hood define a serpentine airflow path to the intake port.

5. The intake system of claim 4, wherein the intake enclosure includes a plurality of walls and a base forming the intake channel, end portions of the walls and base forming the intake port as an entryway to the intake channel, the end portions of the intake walls being oblique from the base at the intake port at an angle between 15 degrees and 85 degrees.

6. The intake system of claim 5, wherein the angle is between 30 and 60 degrees.

7. The intake system of claim 5, wherein the intake port generally faces toward the front of the vehicle and the intake walls are angled toward the rear of the vehicle.

8. The intake system of claim 4, further comprising a seal disposed between the hood and the grille.

9. The intake system of claim 4, wherein the intake enclosure forms an intake channel for channeling air from the intake port at a first end of the enclosure to an air filter coupled to a second end, the intake channel having a first cross-sectional area proximate the intake port that tapers to a second cross-sectional area at a point downstream of the intake port, the first cross-sectional area having an effective diameter about 10% or more greater than the second cross-sectional area for reducing the air velocity at the intake port.

10. The intake system of claim 9, wherein the first cross-sectional area effective diameter is about 99 $cm^2$ and the second cross-sectional area effective diameter is about 88 $cm^2$.

11. The intake system of claim 4, further comprising a radiator disposed within the engine compartment, wherein the apex is disposed rearward of the bulkhead and the radiator is substantially aligned beneath the apex.

12. The intake system of claim 11, wherein the intake enclosure is stepped at a bottom of the channel near the intake port in a plane intersecting the apex.

13. The intake system of claim 4, wherein the hood includes an outer hood skin and an inner hood frame, the hood skin and the hood frame forming an alternate intake passageway therebetween for placing the engine compartment and the intake port in fluid communication.

14. The intake system of claim 13, further including a latch for locking the hood in a closed configuration, wherein the hood frame forms an exit port proximate the hood latch when the hood is in a closed configuration.

15. The intake system of claim 13, wherein the hood frame forms an exit port proximate the intake enclosure intake port when the hood is in a closed configuration.

16. The intake system of claim 1 wherein the intake enclosure includes:
 a base; and
 a plurality of walls, the walls and the base forming an airflow channel having a first end and a second end with an intake port defined at the first end;
 wherein the base is inclined along the channel from the intake port to an apex, and declines from the apex toward the second end, and the base has a step adjacent the intake port for encouraging objects to travel out of the intake channel.

17. The intake system of claim 16, wherein the base and walls form a first channel portion at the first end having a first cross-sectional area and a second channel portion spaced apart from the first cross-sectional area toward the second end having a second cross-sectional area, the first cross-sectional area having an effective diameter about ten percent or more larger than an effective diameter of the second cross-sectional area.

18. The intake system of claim 16, wherein the intake port is formed in a plane angled between 5 degrees and 85 degrees from the base.

19. The intake system of claim 1 wherein the intake enclosure includes:
 a base; and
 a plurality of walls, the walls and the base forming an airflow channel having a first end and a second end with an intake port at the first end;
 wherein the airflow channel includes a bulge between the first and second ends at a high point between the first and second ends, and the intake port is formed in a plane angled between about 5 degrees and about 85 degrees from the base, and the base has a step adjacent the intake port for encouraging objects to travel out of the intake channel.

20. The air intake enclosure of claim 19, wherein the base and walls form a first channel portion at the first end having a first cross-sectional area and a second channel portion having a second cross-sectional area spaced apart from the first cross-sectional area, the first cross-sectional area having an effective diameter about ten percent or more larger than an effective diameter of the second cross-sectional area.

21. A vehicle air intake system, comprising:
 a bulkhead disposed across a forward portion of an engine compartment;
 a grille disposed forward of the bulkhead;
 a hood disposed over the engine compartment;
 an intake enclosure coupled to the bulkhead, the intake enclosure having an intake port, and wherein the bulkhead, the grille and the hood create a serpentine airflow path to the intake port;
 a screen extending from the bulkhead to the grille transverse to the serpentine airflow path; and
 wherein the hood includes an outer hood skin and an inner hood frame, the hood skin and the hood frame forming an alternate intake passageway therebetween for placing the engine compartment and the intake port in fluid communication.

22. The intake system of claim 21, further including a latch for locking the hood in a closed configuration, wherein the hood frame forms an exit port proximate the hood latch when the hood is in a closed configuration.

23. The intake system of claim 21, wherein the hood frame forms an exit port proximate the intake enclosure intake port when the hood is in a closed configuration.

24. An air intake system for a vehicle comprising:
 a bulkhead disposed across a front portion of an engine compartment;
 a grille disposed forward of the bulkhead;
 a hood disposed over the engine compartment;
 an intake enclosure coupled to the bulkhead, the intake enclosure having an intake port;
 a seal disposed between the hood and the intake enclosure;
 wherein the grille, the bulkhead, and the hood create a serpentine airflow path to the intake port; and
 wherein the hood includes an outer hood skin and an inner hood frame, the hood skin and the hood frame forming an alternate intake passageway therebetween for placing the engine compartment and the intake port in fluid communication.

25. The intake system of claim 24, further including a latch for locking the hood in a closed configuration, wherein the hood frame forms an exit port proximate the hood latch when the hood is in a closed configuration.

26. The intake system of claim 24, wherein the hood frame forms an exit port proximate the intake enclosure intake port when the hood is in a closed configuration.

* * * * *